United States Patent
Edwards, II et al.

(10) Patent No.: US 6,749,219 B2
(45) Date of Patent: Jun. 15, 2004

(54) INFLATOR

(75) Inventors: Paul C. Edwards, II, Lapeer, MI (US); Simon A. M. Frith, Warren, MI (US); Jeffery S. Blackburn, Lake orion, MI (US)

(73) Assignee: Automotive Systems Laboratory, Farmington Hills, MI (US)

( * ) Notice: Subject to any disclaimer, the term of this patent is extended or adjusted under 35 U.S.C. 154(b) by 0 days.

(21) Appl. No.: 10/238,476

(22) Filed: Sep. 10, 2002

(65) Prior Publication Data

US 2003/0047925 A1 Mar. 13, 2003

Related U.S. Application Data

(60) Provisional application No. 60/318,759, filed on Sep. 12, 2001.

(51) Int. Cl.[7] .............................................. B60R 21/26
(52) U.S. Cl. ....................................... 280/741; 102/531
(58) Field of Search ................................ 280/741, 736; 102/530, 531

(56) References Cited

U.S. PATENT DOCUMENTS

| | | | | |
|---|---|---|---|---|
| 3,985,076 A | * | 10/1976 | Schneiter et al. ............ 102/531 |
| 4,561,675 A | * | 12/1985 | Adams et al. ............... 280/734 |
| 4,902,036 A | | 2/1990 | Zander et al. .............. 280/736 |
| 5,062,367 A | | 11/1991 | Hayashi et al. ............. 102/530 |
| 5,100,174 A | * | 3/1992 | Jasken et al. ............... 280/741 |
| 5,106,119 A | | 4/1992 | Swann et al. ............... 280/731 |
| 5,622,380 A | | 4/1997 | Khandhadia et al. ........ 280/736 |
| 5,634,661 A | | 6/1997 | Dahl et al. .................. 280/741 |
| 5,851,028 A | | 12/1998 | Thibodeau .................. 280/736 |
| 6,126,197 A | | 10/2000 | Muir et al. .................. 280/741 |

FOREIGN PATENT DOCUMENTS

DE 195 01 837 A1 1/1995 ........... B60R/21/26

* cited by examiner

Primary Examiner—Ruth Ilan
(74) Attorney, Agent, or Firm—Dinnin & Dunn, P.C.

(57) ABSTRACT

A gas generator or inflator 10 preferably contains a housing 12 formed from welding a cap 14 and a base 16 in nested and coaxial relationship. Welding a first wall 15 of the cap 14 with an adjoining and substantially coextensive second wall 17 of the base 16 forms a structural girth. An annulus 36 is preferably formed centrally within the cap 14 thereby providing a seat for an igniter mount 22. An igniter mount 22 is fixed within the annulus 36, and houses an igniter 18 fixed therein.

8 Claims, 1 Drawing Sheet

INFLATOR

CROSS-REFERENCE TO RELATED APPLICATIONS

This application claims the benefit of U.S. Provisional Application Serial No. 60/318,759 having a filing date of Sep. 12, 2001.

BACKGROUND OF THE INVENTION

Gas generators or airbag inflators are well known for their utility in vehicle occupant protection systems. An ongoing concern for manufacturers of airbag inflators is to reduce their complexity and weight while maintaining the requisite operating characteristics. It would therefore be an improvement in the art to reduce the structural requirements typically attendant to airbag inflators thereby reducing the manufacturing complexity and cost.

SUMMARY OF THE INVENTION

In accordance with the present invention, a gas generator preferably contains a housing formed from welding a cap and a base in overlying relationship. Welding a first wall of the cap with an adjoining and substantially coextensive second wall of the base forms a structural girth and concentrically nests the first wall within the second wall. A gas generant is contained within the housing and produces gas upon combustion thereof. In one embodiment, an annulus or body bore is formed centrally within the cap thereby providing a seat for an igniter mount. An igniter mount is crimped or otherwise fixed within the annulus and is preferably laser welded thereto. An igniter is crimped or otherwise fixed within the igniter mount and is therefore suspended within the housing. Notably, in contrast to the conventional practice of incorporating a booster tube fixed to the base and the cap wherein the booster tube houses the igniter, in accordance with the present invention no other structural support is provided about the igniter. As such, the welding requirements and the manufacturing complexity of the inflator are correspondingly reduced.

DETAILED DESCRIPTION

Figure 1:
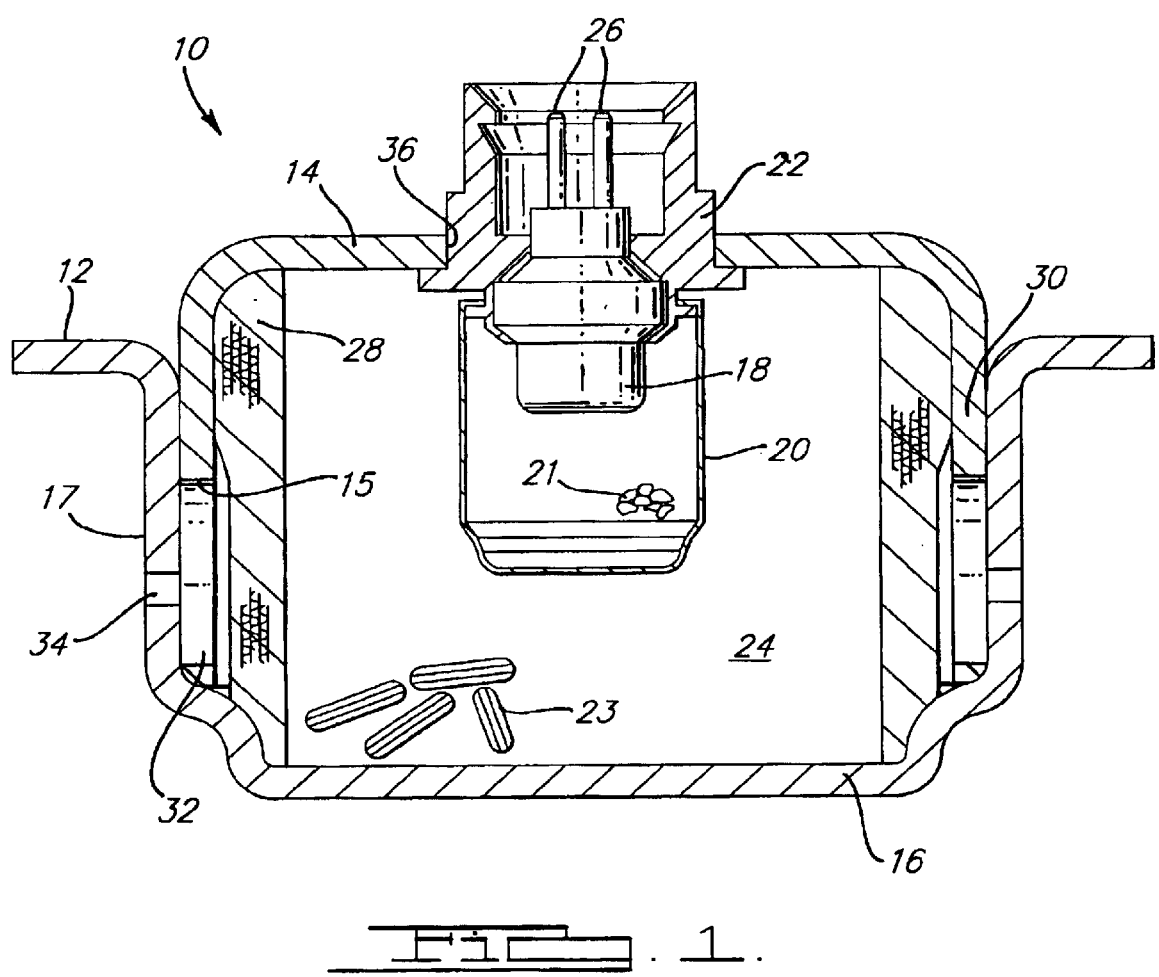
FIG. 1 is a sectional view of an inflator constructed in accordance with the present invention.

Referring to FIG. 1, there is shown an inflator 10 according to a preferred embodiment of the present invention. The inflator 10 includes a housing 12 that is preferably formed from laser welding an upper piece or cap 14 and a lower piece or base 16 in nested and coaxial relationship. Other welding methods, such as arc welding may also be employed provided the heat generated during the welding process does not result in autoignition of the propellant contained within the housing 12. A first wall 15 is defined about the circumference or periphery of cap 14. A second wall 17 is defined about the circumference or periphery of base 16. The first wall 15 is preferably substantially coextensive with the second wall 17. When press fitted and then laser welded together, the walls 15 and 17 form a structural girth that contributes to the overall strength of the housing 12. In a first embodiment, the cap 14 further includes a radially centered bore or annulus 36.

In further accordance with the present invention, an igniter mount 22 is preferably crimped and then welded or otherwise fixed within the annulus 36. An igniter 18 is crimped to the igniter mount 22, and extends at least partially into a combustion chamber 24. In a preferred embodiment, the igniter 18 includes electrical conductors 26 that communicate with a crash sensor(s), wherein the igniter 18 responds to a signal produced from a crash sensor algorithm in a manner well known in the art, thereby igniting the gas generant 23.

Various inflators employing a booster tube or structural tube fixed to the base and cap and thereby providing additional structural support for the inflator are known in the art. For example, U.S. Pat. No. 5,622,380 to Khandhadia and Stratton, herein incorporated by reference, discloses an inflator with a booster tube that contributes to the overall structural support of the inflator. In the present invention, eliminating the need for such a tube or similar structure allows the inflator to be produced with fewer components than other inflators, and lowers the weight and production costs. In addition, the structural girth laser weld increases the strength of the inflator because of the press fit of walls 15 and 17 and the effective doubling of the wall strength.

Returning to FIG. 1, a gas generant 23 is housed within combustion chamber 24. The gas generant 23 may be any propellant known for its use in airbag or other pyrotechnic applications within a vehicle occupant protection system. Upon a crash event, igniter 18 ignites the propellant 23 by initiation of ignition compound 21. A first plurality of gas exit apertures 32 are preferably formed radially about the first wall 15 of the cap 14. A second plurality of gas exit apertures 34 are preferably formed radially about the base 16 within the second wall 17, wherein each gas exit aperture 34 fluidly communicates with at least one corresponding gas exit aperture 32 and thereby facilitates release of combustion gases from the inflator 10 into an airbag (not shown) in fluid communication therewith.

Other permutations of the invention are contemplated. For example, two igniters rather than one igniter may be employed in a dual chamber inflator. The second igniter would be mounted in the same way as the first igniter shown in FIG. 1 and as described above. Additionally, the inflator may contain either a lateral or longitudinal divider fixed to the housing 12 thereby forming at least two chambers. Nevertheless, the structural girth formed by joining the peripheral wall 15 of the cap with the peripheral wall 17 of the base will similarly enhance the strength of a dual chamber inflator.

Accordingly, the particular embodiments disclosed herein are meant to be illustrative only and not limiting as to the scope of the invention, which is to be given the full breadth of any claims that are appended hereto, and any and all equivalents thereof as are now or in the future understood by those of ordinary skill.

What is claimed is:

1. A gas generator comprising:
    a housing comprising a base and a cap joined in nested relationship, said cap comprising a first plurality of gas exit apertures and an annulus formed centrally thereof, and said base forming a second plurality of gas exit apertures in fluid communication with said first plurality of gas exit apertures;
    a first wall on said cap formed radially outward thereof and extending along the cap periphery, said first plurality of gas exit apertures formed in said first wall;
    a second wall on said base formed radially outward thereof and extending along the base periphery wherein said first and second walls are substantially adjacent and coextensive and are fixed together in nested and coaxial orientation;

a gas generant within said housing; and an igniter fixed within said annulus for igniting said gas generant wherein said igniter is structurally supported within said annulus only.

2. The gas generator of claim 1 wherein said housing contains an annular filter for filtering combustion products of said gas generant.

3. A vehicle occupant protection system comprising a gas generator as claimed in claim 1.

4. A gas generator comprising:

a housing comprising a base and a cap;

a first wall extending about the radial periphery of said cap;

a second wall extending about the radial periphery of said base wherein said base and said cap are fixed in nested and coaxial relationship by adjoining the first wall to the second wall;

a first plurality of apertures formed in said first wall;

a second plurality of apertures formed in said second wall, wherein said first plurality of apertures fluidly communicates with said second plurality of apertures upon actuation of said gas generator;

a gas generant contained within said housing;

an igniter seated within said cap for igniting said gas generant, wherein said first wall and said second wall when joined form a structural girth that alone provides structural support between the cap and the base.

5. The gas generator of claim 4 further comprising an annular filter disposed radially outwardly within said housing for filtering gas generant combustion products.

6. The gas generator of claim 4 further comprising an igniter mount fixed within said annulus for housing said igniter.

7. The gas generator of claim 4 wherein said base and said cap are joined by laser weld along said first and second walls.

8. A vehicle occupant protection system comprising a gas generator as claimed in claim 4.

* * * * *